(12) United States Patent
Heo et al.

(10) Patent No.: US 10,509,561 B2
(45) Date of Patent: Dec. 17, 2019

(54) TRANSFORMABLE DISPLAY AND METHOD FOR OPERATING SAME

(71) Applicant: LG ELECTRONICS INC., Seoul (KR)

(72) Inventors: Jeongyun Heo, Seoul (KR); Shinnyue Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/577,226

(22) PCT Filed: Jun. 24, 2015

(86) PCT No.: PCT/KR2015/006442
§ 371 (c)(1),
(2) Date: Nov. 27, 2017

(87) PCT Pub. No.: WO2016/190479
PCT Pub. Date: Dec. 1, 2016

(65) Prior Publication Data
US 2018/0136835 A1     May 17, 2018

(30) Foreign Application Priority Data
May 27, 2015    (KR) .................. 10-2015-0073901

(51) Int. Cl.
*G06F 3/0488*     (2013.01)
*G06F 3/0482*     (2013.01)
(Continued)

(52) U.S. Cl.
CPC .......... *G06F 3/04886* (2013.01); *G06F 1/163* (2013.01); *G06F 1/1643* (2013.01);
(Continued)

(58) Field of Classification Search
CPC .......... G06F 3/01; G06F 3/048; G06F 3/0482; G06F 3/0484; G06F 3/0486; G06F 3/0488; G06F 3/04886
See application file for complete search history.

(56) References Cited

U.S. PATENT DOCUMENTS 8,786,555 B2 *   7/2014   Bloomcamp ........... G06F 3/016
                                               178/18.01
9,176,667 B2 *   11/2015   Yoon ..................... G06F 3/0238
(Continued)

FOREIGN PATENT DOCUMENTS

KR    10-2010-0041733 A     4/2010
KR    10-2011-0117772 A     10/2011
(Continued)

*Primary Examiner* — Andrea N Long
(74) *Attorney, Agent, or Firm* — Birch, Stewart, Kolasch & Birch, LLP

(57) ABSTRACT

A method for operating a transformable display provided with a transformable display unit, according to one embodiment of the present invention, comprises the steps of: sensing force applied to the display unit; expanding or reducing a screen displayed by the display unit by means of the force which has been sensed; and displaying a keyboard window having different types of keyboards depending on expansion distance, that is, the distance to which the display unit has been expanded.

9 Claims, 19 Drawing Sheets

(51) Int. Cl.
  *G06F 3/0486* (2013.01)
  *G06F 1/16* (2006.01)
  *G06F 3/041* (2006.01)
  *G06F 3/044* (2006.01)

(52) U.S. Cl.
  CPC .......... *G06F 1/1652* (2013.01); *G06F 1/1677* (2013.01); *G06F 3/041* (2013.01); *G06F 3/044* (2013.01); *G06F 3/0414* (2013.01); *G06F 3/0482* (2013.01); *G06F 3/0486* (2013.01); *G06F 2203/04803* (2013.01)

(56) References Cited

U.S. PATENT DOCUMENTS

| | | | | |
|---|---|---|---|---|
| 2004/0183834 | A1* | 9/2004 | Chermesino | G06F 3/04886 715/773 |
| 2008/0303782 | A1* | 12/2008 | Grant | G06F 1/1615 345/156 |
| 2011/0074692 | A1* | 3/2011 | Causey | G06F 3/0216 345/169 |
| 2012/0117506 | A1* | 5/2012 | Koch | G06F 3/04886 715/773 |
| 2012/0206363 | A1* | 8/2012 | Kyprianou | G06F 3/04883 345/168 |
| 2013/0154971 | A1* | 6/2013 | Kang | G06F 3/0414 345/173 |
| 2013/0203469 | A1* | 8/2013 | Cho | G06F 3/04886 455/566 |
| 2013/0234942 | A1* | 9/2013 | Yoo | G06F 3/04886 345/168 |
| 2013/0307816 | A1* | 11/2013 | Lee | G06F 1/1652 345/174 |
| 2014/0015743 | A1* | 1/2014 | Seo | G06F 1/1694 345/156 |
| 2014/0098075 | A1* | 4/2014 | Kwak | G06F 3/0487 345/204 |
| 2014/0218298 | A1* | 8/2014 | Law | G06F 3/0216 345/168 |
| 2016/0110097 | A1* | 4/2016 | Cho | G06F 3/04886 345/178 |
| 2017/0075431 | A1* | 3/2017 | Nurijanyan | G06F 3/0237 |

FOREIGN PATENT DOCUMENTS

| | | |
|---|---|---|
| KR | 10-2014-0025231 A | 3/2014 |
| KR | 10-2014-0094487 A | 7/2014 |
| WO | WO 2014/021660 A2 | 2/2014 |

* cited by examiner

FIG. 2A
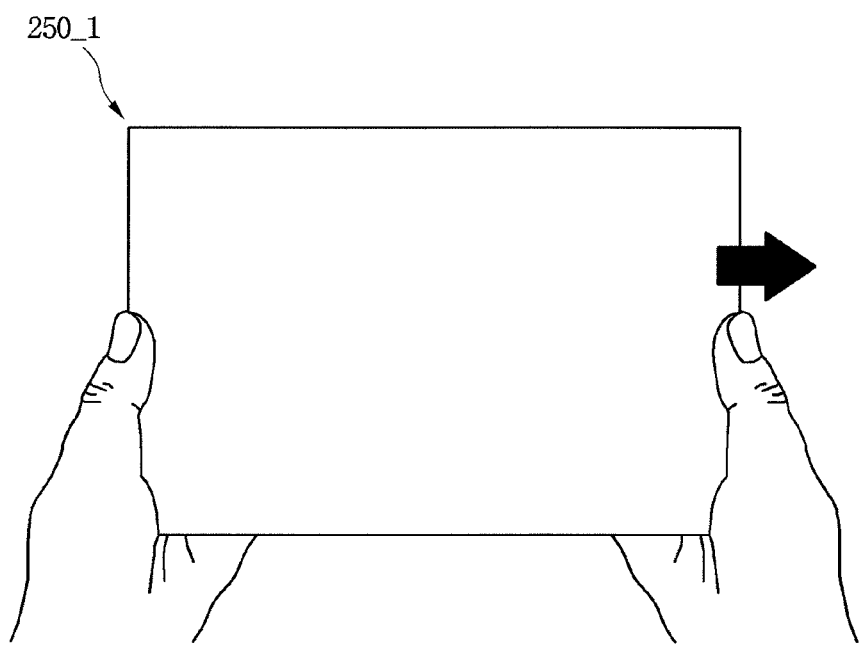
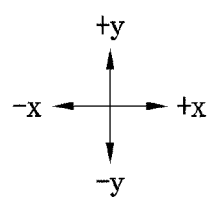

FIG. 2B
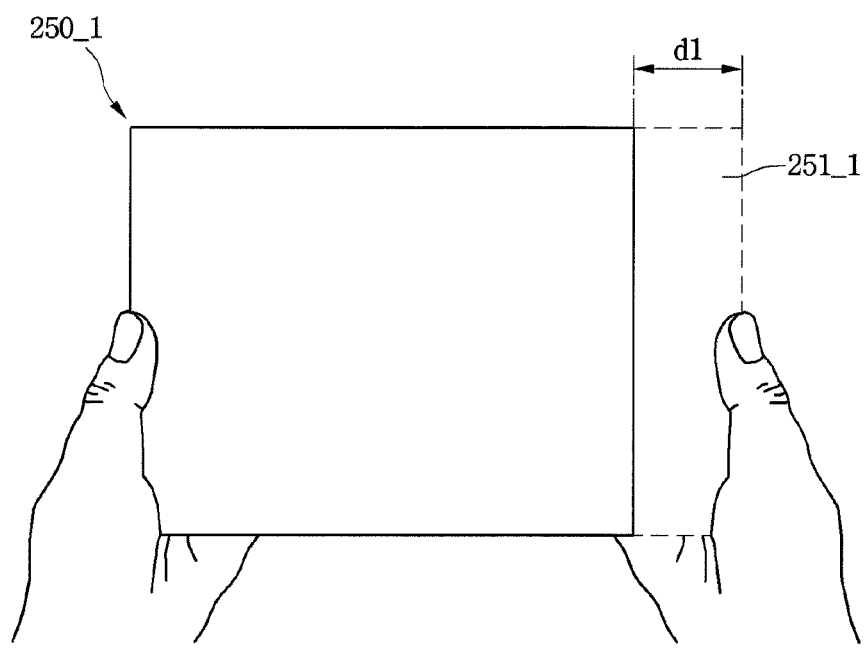
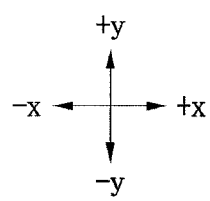

200-2

200-2

FIG. 3C
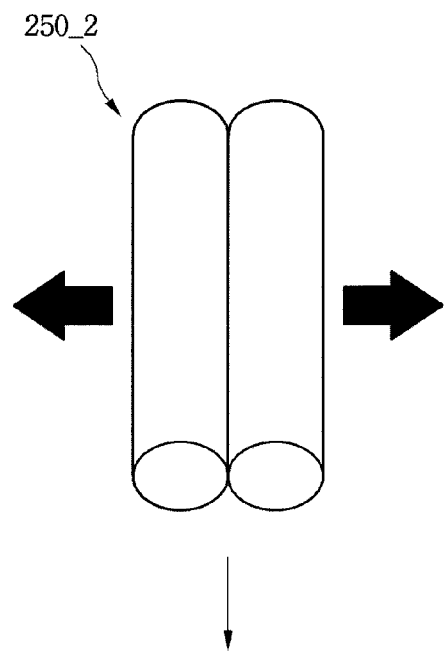
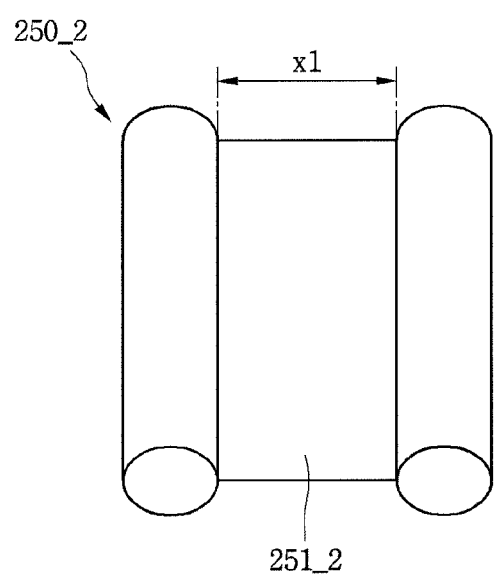

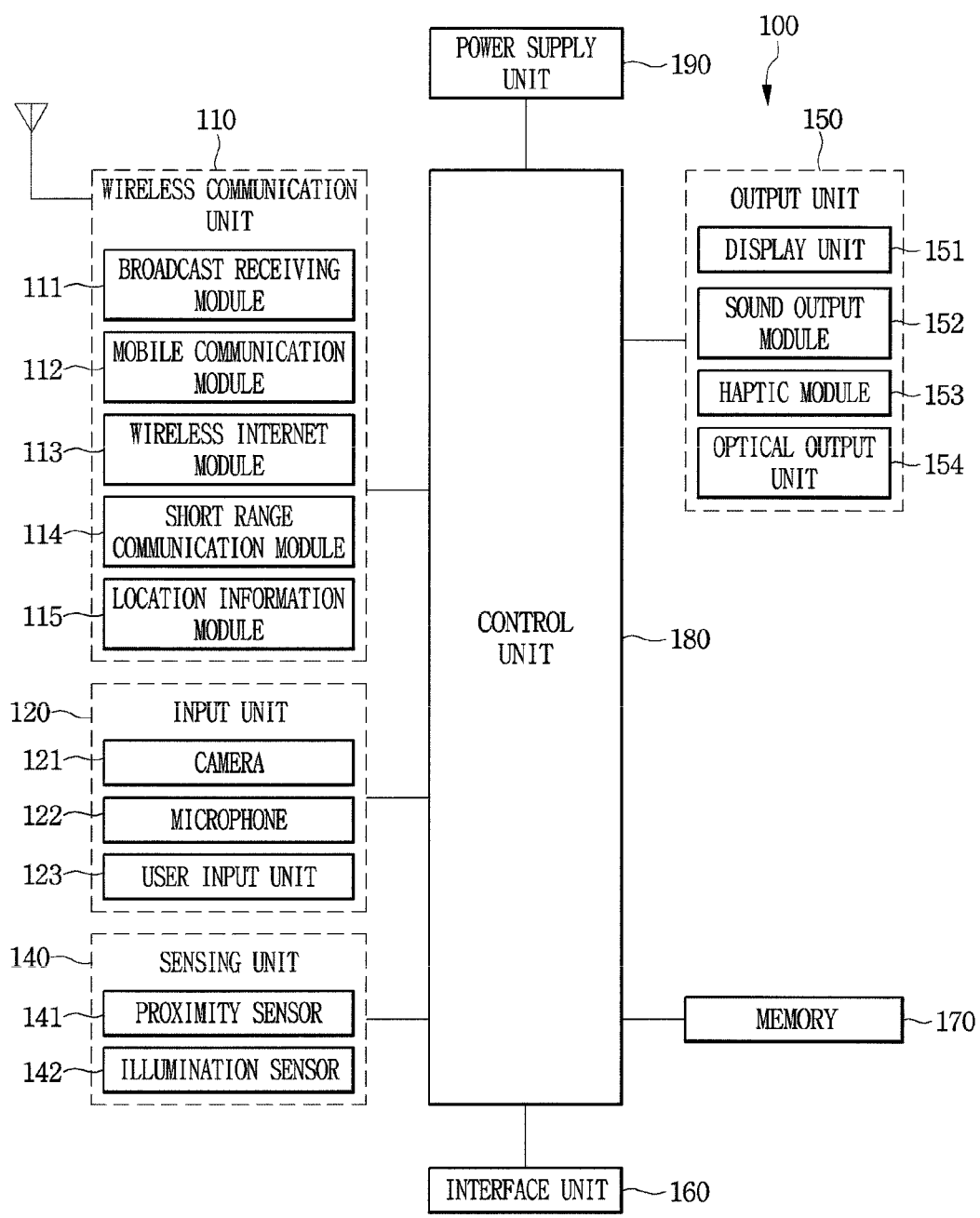

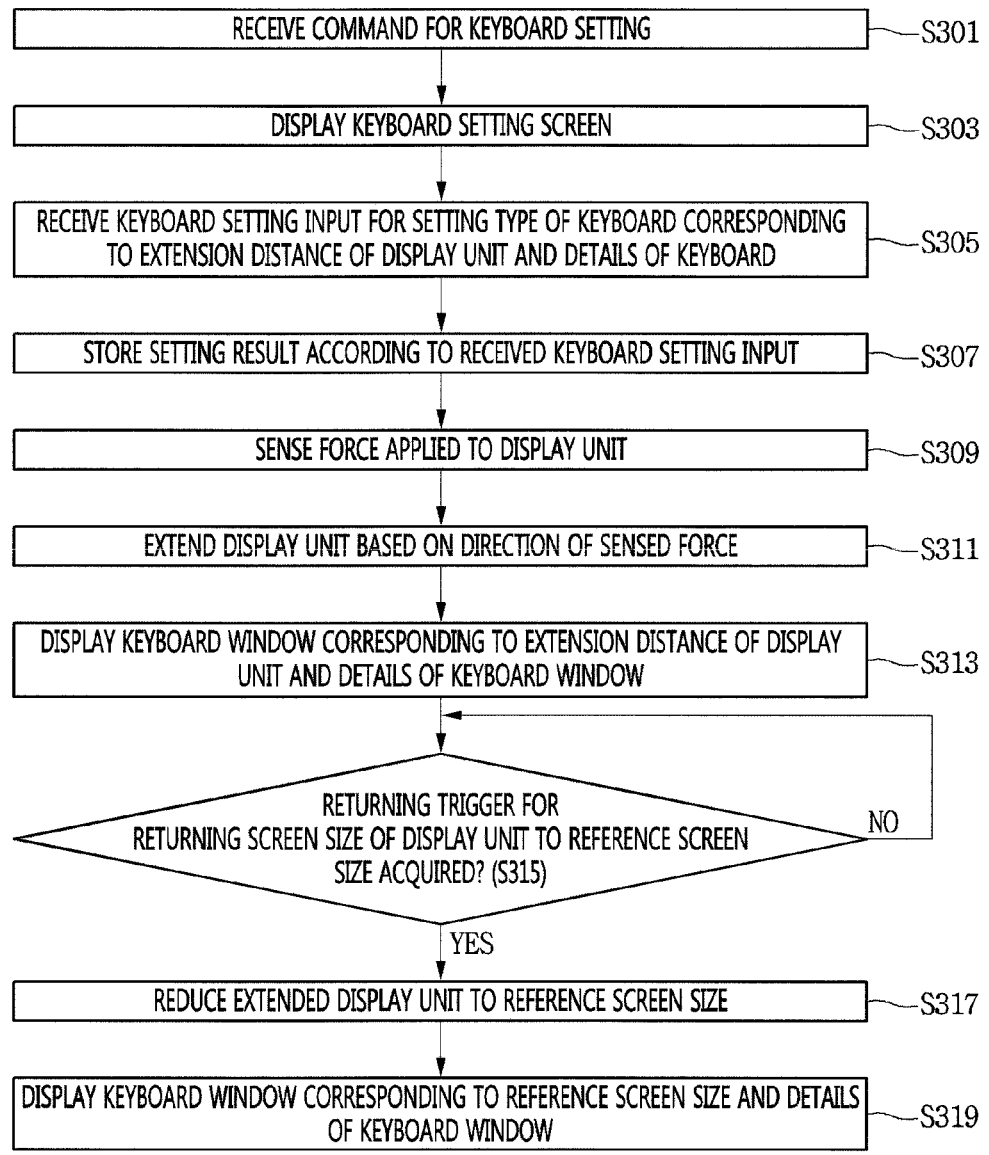

<wearable device>

\<smart phone\>

\<phablet\>

\<tablet\>

TRANSFORMABLE DISPLAY AND METHOD FOR OPERATING SAME

CROSS REFERENCE TO RELATED APPLICATIONS

This application is the National Phase of PCT International Application No. PCT/KR2015/006442, filed on Jun. 24, 2015, which claims priority under 35 U.S.C. 119(a) to Patent Application No. 10-2015-0073901, filed in Republic of Korea on May 27, 2015, all of which are hereby expressly incorporated by reference into the present application.

TECHNICAL FIELD

The present invention relates to a deformable display and method of operating the same.

BACKGROUND ART

With the recent development of a display related technique, display devices deformable such as folded, rolled in a roll type, or stretchable in at least one direction in a use stage are being researched and developed. Since these displays are deformable in various types, both requests for display enlargement and display miniaturization for carrying in a use step may be satisfied.

Furthermore, a deformable display device may be deformable in a preset type, and also be deformable in various types in correspondence to a user's request or as necessary for a situation where the display is used. Accordingly, when a displaying area of a display is fixed, inconvenience in use may occur.

DISCLOSURE

Technical Problem

An object of the present invention is to provide a display device capable of extending or reducing a display unit through simple operation according to a user request, and a method of operating the same.

Another object of the present invention is to provide a display device for providing keyboard windows having various shapes for inputting information according to a degree of extension of a display unit, and a method of operating the same.

Technical Solution

The object of the present invention can be achieved by providing a method of operating a deformable display device including a deformable display unit including sensing force applied to the display unit, extending or reducing a screen displayed by the display unit by the sensed force, and displaying a different type of keyboard window according to an extension distance of the screen.

In another aspect of the present invention, provided herein is a deformable display device including a display unit extended or reduced in at least one direction, a sensing unit configured to sense force applied to the display unit, and a controller configured to control the display unit to extend a screen displayed by the display unit based on the sensed force and to display a different type of keyboard window according to an extension distance of the screen.

The controller may receive keyboard setting input for setting the keyboard type corresponding to the extension distance of the display unit, and the deformable display device may further include a memory configured to store a setting result according to the received keyboard setting input.

The controller may receive a command for keyboard setting and control the display unit to display a keyboard setting screen according to the received command.

The keyboard setting screen may include a screen size setting bar for setting a screen size of the display unit and a keyboard type setting region for setting a keyboard type corresponding to the screen size.

The keyboard setting screen may further include a keyboard details setting region for setting one or more of a shape, location and size of a keyboard corresponding to a screen size of the display unit set through the screen size setting bar and the keyboard type set in the keyboard type setting region.

The controller may receive keyboard details setting input for setting at least one of the shape, location and size of one or more input buttons configuring the keyboard in the keyboard details setting region, and control the display unit to display details set according to the keyboard details setting input and a keyboard window of the keyboard type set according to the keyboard type setting input.

The keyboard type may be any one of a handwriting keyboard type, a qwerty keyboard type, a split keyboard type for splitting a plurality of input button groups configuring a keyboard window and a movable keyboard type capable of moving a location of the keyboard window.

Advantageous Effects

According to various embodiments of the present invention, it is possible to provide keyboard windows having various shapes according to a degree of extension of a screen of a display unit to satisfy various requests related to user information input.

DESCRIPTION OF DRAWINGS

FIGS. 2a and 2b are diagrams illustrating an example of using a stretchable display device as an example of a deformable display device.

FIGS. 3a to 3c are diagrams illustrating an example of using a rollable display device as an example of a deformable display device.

FIG. 4 is a block diagram illustrating a mobile terminal related to the present invention.

FIG. 5 is a flowchart illustrating a method of operating a deformable display device according to another embodiment of the present invention.

BEST MODE

Figure 1A:
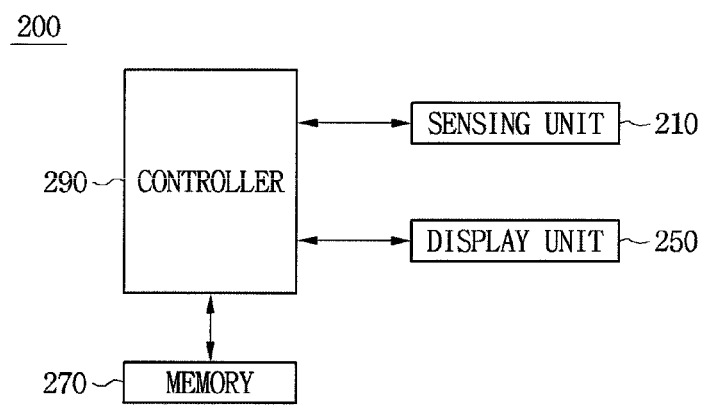
FIG. 1a is a block diagram illustrating the configuration of a deformable display device according to an embodiment of the present invention.

Hereinafter, the embodiments of the present invention will be described in detail with reference to the accompanying drawings, in which the same or similar portions are denoted by the same reference numerals and repeated descriptions thereof will be omitted. The suffixes "module" and "unit" of elements herein are used for convenience of description and thus can be used interchangeably and do not have any distinguishable meanings or functions. In describing the present invention, a detailed description of known functions and configurations will be omitted when it may obscure the subject matter of the present invention. The accompanying drawings are used to help easily understand the technical idea of the present invention and it should be understood that the idea of the present invention is not limited by the accompanying drawings. The idea of the present invention should be construed to extend to any alterations, equivalents and substitutions besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected to" or "coupled to" another element, the element can be directly connected to or coupled to the other element or intervening elements may also be present. In contrast, when an element is referred to as being "directly connected to" or "directly coupled to" another element, there are no intervening elements present.

A singular representation may include a plural representation unless the context clearly indicates otherwise.

It will be understood that the terms 'comprise', 'include', etc., when used in this specification, specify the presence of features, numerals, steps, operations, elements, parts or combinations thereof described in the specification and presence or addition of one or more other features, numerals, steps, operations, elements, parts or a combination thereof is not excluded.

Figure 1B:
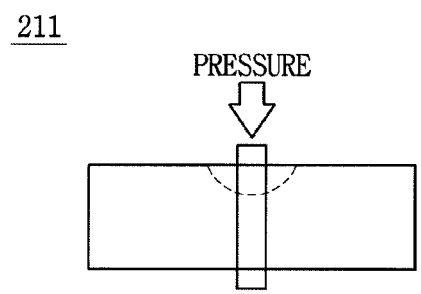
FIG. 1b is a diagram illustrating a pressure sensor configuring a sensing unit.
Figure 1C:
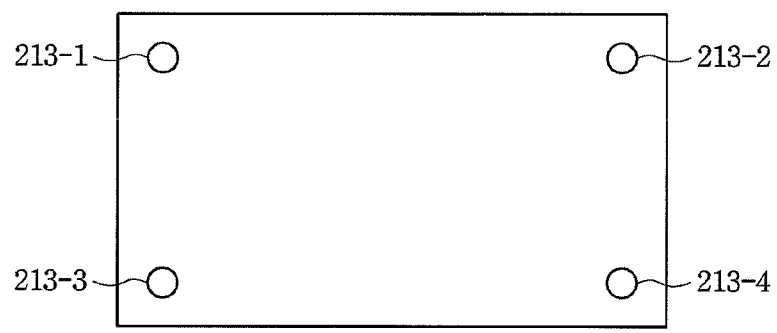
FIG. 1c is a diagram illustrating the configuration of a display unit 250 including a sensing unit including a plurality of acceleration sensors.

FIGS. 1a to 1c are diagrams illustrating the configuration of a deformable display device according to an embodiment of the present invention.

In particular, FIG. 1a is a block diagram illustrating the configuration of a deformable display device 200 according to an embodiment of the present invention, FIG. 1b is a diagram illustrating a pressure sensor 211 configuring a sensing unit 210, and FIG. 1c is a diagram illustrating the configuration of a display unit 250 including a sensing unit 210 including a plurality of acceleration sensors 213-1 to 213-4.

The deformable display device 200 according to the embodiment of the present invention is a next-generation bendable or extensible display device which can be implemented in a variety of new environments, unlike existing display devices which have been implemented in a rigid material such as glass or silicon.

In one embodiment, the deformable display device 200 may be stretchable display device which may be extended upon being pulled and returned to an original state upon being released. The stretchable display device may be extended upon being pulled and may be fixed in an extended state when a predetermined time expires in a state of being extended. In addition, the stretchable display device may be returned to the original state when force for reducing the display device is applied.

In another embodiment, the deformable display device 200 may be a rollable display device which may be rolled or unrolled like paper.

Referring to FIG. 1a, the deformable display device 200 may include a sensing unit 210, a display unit 250, a memory 270 and a controller 290.

The sensing unit 210 may sense the strength and direction of force applied to the display unit 250.

In one embodiment, the sensing unit 210 may include one or more pressure sensors. One or more pressure sensors may be arranged in the display unit 250. If the sensing unit 210 includes one or more pressure sensors, each pressure sensor 211 may detect capacitance change or resistance change between both ends of a region, to which pressure (force) is applied, as shown in FIG. 1b. The pressure sensor 211 may deliver one or more of a capacitance change signal indicating the detected capacitance change or a resistance change signal indicating the detected resistance change. The capacitance change signal or the resistance change signal may include information on one or more of the strength and direction of force applied to the pressure sensor 211. The controller 290 may acquire one or more of the strength and direction of force applied to the display unit 250 using the capacitance change signal or the resistance change signal received from the pressure sensor 211.

In another embodiment, the sensing unit 210 may include a plurality of acceleration sensors 213-1 to 213-4, as shown in FIG. 1c. The acceleration units may be arranged adjacent to vertexes of a rectangle when the display unit 250 has a rectangular shape. If the display unit 250 includes a deformable substrate (which will be described below) and an image display unit, the plurality of acceleration sensors 213-1 to 213-4 may be provided on a lower end of the deformable substrate and the image display unit may be provided on an upper end of the deformable substrate, for example. Alternatively, the plurality of acceleration sensors may be provided in the deformable substrate or the image display unit.

The acceleration sensor detects acceleration or the strength of impact when an object moves. When the acceleration sensor is used, movement of the display unit 250 may be precisely sensed. The acceleration sensor may sense acceleration of the display unit 250 in three-axis (x-axis, y-axis and z-axis) directions perpendicular to each other. The controller 290 may acquire a movement speed using acceleration of the three-axis direction measured through the acceleration sensors. The controller 290 may acquire an extension distance of the display unit 250 in the three-axis directions using the acquired movement speed. The controller 290 may acquire the direction and strength of force applied to the display unit 250 using the movement speed and distance acquired using the acceleration sensors. The controller 290 may extend the display unit 250 according to the acquired direction and strength of force.

In another embodiment, the sensing unit 210 may include a plurality of Hall sensors. The plurality of Hall sensors may be provided inside the display unit 250 or on the display unit 250. If the sensing unit 210 includes a plurality of Hall sensors, the controller 290 may extend or reduce the display unit 250 through a voltage sensed by the Hall sensors according to force applied to the display unit 250.

The display unit 250 may be stretched in at least one direction. The display unit 250 may include a deformable substrate and an image display unit. The deformable substrate may be made of PDMS (polydimethylsiloxane having good elasticity and may be extended by pulling force. The image display unit may be formed on the deformable substrate and may be extended as the deformable substrate is extended. The image display unit may display an image.

The display unit 250 may include an organic light emitting diode (OLED).

The memory 270 may store the strength of force applied to the display unit 250 and a degree of extension or reduction of the display unit 250 corresponding to the strength of force applied to the display unit 250. The degree of extension of the display unit 250 may indicate the increased length of the display unit 250 and the degree of reduction of display unit 250 may indicate the decreased length of the display unit 250.

The controller 290 may extend or reduce the display unit 250 according to force sensed by the sensing unit 210. Extension of the display unit 250 may indicate increase in size of the screen of the display unit 250, and reduction of the display unit 250 may indicate decrease in size of the screen of the display unit 250. The controller 290 may change graphics or images displayed on the screen as the size of the screen of the display unit 250 increases or decreases.

In addition, the controller 290 may control overall operation of the deformable display device 200. Detailed operation of the controller 290 will be described with reference to the following drawings.

FIGS. 2a and 2b are diagrams illustrating an example of using a stretchable display device as an example of a deformable display device.

FIG. 2a shows a display unit 250_1 before a stretchable display unit 200_1 is stretched. In this state, if force is applied to the display unit 250_1 in a +x-axis direction, the controller 290 may extend the display unit 250_1 by an extension distance d1 in the +x-axis direction, as shown in FIG. 2b. As the display unit 250_1 is extended, the display unit 250 may be extended by the extension region 252-1 corresponding to the extension distance d1. That is, the size of the screen of the display unit 250 may increase by the extension region 251_1. Although only force applied in the +x-axis direction is described in FIG. 2, this is only exemplary. In contrast, if force is applied to the display unit 250_1 in a −x-axis direction, the controller 290 may return the display unit 250_1 to an original size.

Figure 3A:
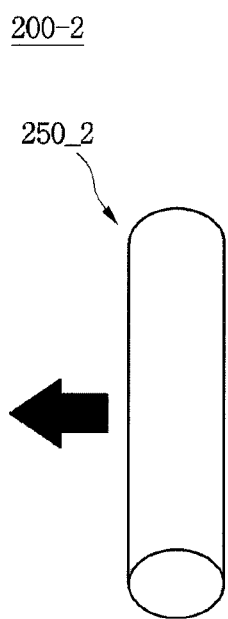
Figure 3B:
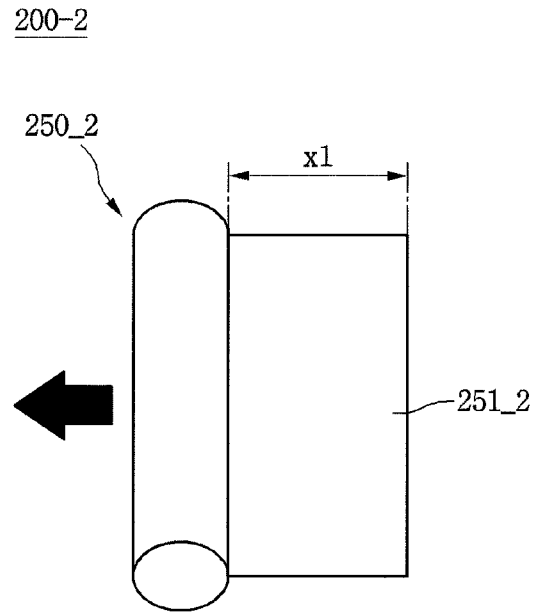

FIGS. 3a to 3c are diagrams illustrating an example of using a rollable display device as an example of a deformable display device.

Referring to FIG. 3a, the display unit 250_2 of the rollable display device 200_2 is rolled like paper. In this state, if force is applied to the display unit 250_2 in the −x-axis direction, the controller 290 may unroll the display unit 250_2 by a distance x1, as shown in FIG. 3b. As the display unit 250_2 is unrolled by the distance x1, the display unit 250_2 may be extended by an unrolled region 251_2. That is, the size of the screen of the display unit 250 may increase by the unrolled region 251_2.

The rollable display device 200_2 may be bidirectionally unrolled by applied force. The user may extend the display unit 250_2 by unrolling the display unit 250_2 with both hands. That is, as shown in FIG. 3c, if force is applied to the display unit 250_2 in +x-axis and −x-axis directions, the controller 290 may unroll the display unit 250_2 by the distance x1 in the +x-axis direction and the −x-axis direction. Therefore, the display unit 250_2 may be extended by a region 251_2 corresponding to the unrolled distance x1. That is, the size of the screen of the display unit 250 may increase by the unrolled region 251_2.

The deformable display device 200 may include all elements of the mobile terminal 100 which will be described below with reference to FIG. 4.

Next, the configuration of the mobile terminal included in the deformable display device 200 will be described with reference to FIG. 4.

FIG. 4 is a block diagram illustrating a mobile terminal related to the present invention.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

In this case, the deformable display device 200 may include elements of the mobile terminal 100. In particular, the sensing unit 210 of the deformable display device 200 may perform the function of the sensing unit 140 of the mobile terminal 100, the display unit 250 may perform the function of the display unit 151 of the mobile terminal 100, and the memory 270 may perform the memory 170 of the mobile terminal 100.

The mobile terminal 100 may include a wireless communication unit 110, an input unit 120, a sensing unit 140, an output unit 150, an interface unit 160, a memory 170, a controller 180 and a power supply unit 190. The elements shown in FIG. 4 are not necessary to implement the mobile terminal and the mobile terminal described in this specification may include more or fewer elements than the above-described elements.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 4, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 may control at least some of the elements illustrated in FIG. 36 according to the execution of an application program that have been stored in the memory 170. Further, the controller 180 may operate at least two of the elements included in the mobile terminal 100 in order to execute the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the elements may cooperatively operate in order to implement operations, control or control methods of the mobile terminal according to the below-described various embodiments. In addition, the operations, control or control methods of the mobile terminal may be implemented on the mobile terminal by executing at least one application program stored in the memory 170.

Hereinafter, prior to various embodiments implemented through the above-described mobile terminal 100, the above-described components will be described in greater detail with reference to FIG. 36.

First, the wireless communication unit 110 will be described. The broadcast reception module 111 of the wireless communication unit 110 receives a broadcast signal and/or broadcast related information from an external broadcast management server through a broadcast channel. The broadcast channel may include a satellite channel and a terrestrial channel. For simultaneous broadcast reception of two or more broadcast channels or broadcast channel switching, two or more broadcast reception modules may be provided in the mobile terminal 100.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.).

The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EE-PROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Next, a communication system which may be implemented through a mobile terminal 100 according to the present invention will be described.

First, the communication system may use different wireless interfaces and/or physical layers. For example, examples of the wireless interface used by the communication system may include Frequency Division Multiple Access (FDMA), Time Division Multiple Access (TDMA), Code Division Multiple Access (CDMA), Universal Mobile Telecommunications Systems (UMTS) (particularly, LTE (Long Term Evolution), LTE-A (Long Term Evolution-Advanced)), Global System for Mobile Communications (GSM), etc.

Hereinafter, for convenience of description, CDMA is used. However, the present invention is applicable to all communication systems including an OFDM (Orthogonal Frequency Division Multiplexing) wireless communication system in addition to a CDMA wireless communication system.

The CDMA wireless communication system may include at least one terminal 100, at least one base station (BS) (also referred to as a Node B or an Evolved Node B)), at least one base station controller (BSC), and a mobile switching center (MSC). The MSC is configured to be connected to a public switched telephone network (PSTN) and the BSC. The BSC may be connected to the BS through a backhaul line to form a pair. The backhaul line may be provided according to at least one of E1/T1, ATM, IP, PPP, Frame Relay, HDSL, ADSL or xDSL. Accordingly, a plurality of BSCs may be included in the CDMA wireless communication system.

Each of a plurality of BSs may include at least one sector and each sector may include an omnidirectional antenna or an antenna having a specific radial direction from the BS. In addition, each sector may two or more antennas having various shapes. Each BS may be configured to support assignment of a plurality of frequencies and the plurality of assigned frequencies may have specific spectra (e.g., 1.25 MHz, 5 MHz, etc.).

Intersection between the sector and frequency assignment may be referred to as a CDMA channel. A BS may be referred to as a base station transceiver subsystem (BTS). In this case, a combination of one BSC and at least one BS may be referred to as a "base station". The base station may be referred to as "cell site". Alternatively, a plurality of sectors for a specific BS may be referred to as a plurality of cell sites.

A broadcasting transmitter (BT) transmits a broadcast signal to terminals 100 operating in the system. The broadcast reception module shown in FIG. 36 is provided in the terminal 100 in order to receive the broadcast signal transmitted by the BT.

In addition, a global positioning system (GPS) for checking the position of the mobile terminal 100 may be linked to the CDMA wireless communication system. The satellite 300 assists in identifying the position of the mobile terminal 100. Useful position information may be acquired by two or less satellites or two or more satellites. Here, the position of the mobile terminal 100 may be tracked not only using GPS tracking technology but also using all technologies capable of tracking the position of the terminal. In addition, at least one of GPS satellites may selectively or additionally perform satellite DMB transmission.

The location information module 115 provided in the mobile terminal detects, calculates or identifies the position of the mobile terminal and representative examples thereof may include a GPS module and a Wi-Fi (Wireless Fidelity) module. As necessary, the location information module 115 may perform the function of any one of the other modules of the wireless communication unit 110 in order to additionally obtain data on the position of the mobile terminal.

The GPS module 115 may accurately calculate current 3D position information according to latitude, longitude and altitude by calculating information on distances from three or more satellites and accurate time information and applying triangulation to the calculated information. Currently, a method of calculating position and time information using three satellites and correcting errors of the calculated position and time information using another satellite is widely used. In addition, the GPS module may calculate speed information by continuously calculating the current position in real time. In a shadow zone of a satellite signal such as an interior, it is difficult to accurately measure the position of the mobile terminal using the GPS module. In order to compensate for positioning of the GPS method, a WPS (WiFi Positioning System) may be used.

The WPS (WiFi Positioning System) uses technology for tracking the position of the mobile terminal 100 using the Wi-Fi module provided in the mobile terminal 100 and a wireless access point (AP) for transmitting or receiving a wireless signal to or from the Wi-Fi module, which means wireless local area network (WLAN) based positioning technology.

The WPS may include a Wi-Fi positioning server, the mobile terminal 100, a wireless AP connected to the mobile terminal 100, and a database for storing arbitrary wireless AP information.

The mobile terminal 100, which is being connected to the wireless AP, may transmit a position information request message to the Wi-Fi positioning server.

The Wi-Fi positioning server extracts information on the wireless AP connected to the mobile terminal 100 based on the position information request message (or signal) of the mobile terminal 100. The information on the wireless AP connected to the mobile terminal 100 may be transmitted to the Wi-Fi positioning server through the mobile terminal 100 or from the wireless AP to the Wi-Fi positioning server.

The information on the wireless AP extracted based on the position information request message of the mobile terminal 100 may be at least one of a MAC Address, an SSID (Service Set IDentification), a RSSI (Received Signal Strength Indicator), a RSRP (Reference Signal Received Power), a RSRQ (Reference Signal Received Quality), channel information, privacy, network type, signal strength and noise strength.

The Wi-Fi positioning server may receive information on the wireless AP connected to the mobile terminal 100 and extract information on a wireless AP corresponding to a wireless AP, which is being connected to the mobile terminal, from a previously stabled database as described above. At this time, information on arbitrary wireless APs stored in the database may include an MAC Address, an SSID, channel information, Privacy, Network Type, latitude/longitude coordinates of the wireless AP, the name of a building in which the wireless AP is located, the number of floors, detailed indoor position information (GPS coordinates are available), the address and phone number of the AP owner, etc. At this time, in order to eliminate a wireless AP provided using a movable AP or an illegal MAC address in the positioning process, the Wi-Fi positioning server may extract only a predetermined number of pieces of wireless AP information in descending order of RSSIs.

Thereafter, the Wi-Fi positioning server may extract (or analyze) the position information of the mobile terminal 100 using at least one piece of wireless AP information extracted from the database. The included information and the received wireless AP information are compared to extract (or analyze) the position information of the mobile terminal 100.

As the method of extracting (or analyzing) the position information of the mobile terminal 100, a cell-ID method, a fingerprint method, a triangulation method, a landmark method, etc. may be used.

The cell-ID method refers to a method of determining the position of a wireless AP having strongest signal strength among peripheral wireless AP information collected by the mobile terminal as the position of the mobile terminal. This method is advantageous in simple implementation, low costs and rapid acquisition of position information, but is disadvantageous in that positioning precision is decreased as the density of wireless APs is decreased.

The fingerprint method refers to a method of selecting a reference position in a service area, collecting signal strength information, and estimating a position through the signal strength information transmitted by the mobile terminal based on the collected information. In order to use the fingerprint method, a propagation property database needs to be previously built.

The triangular method refers to a method of calculating the position of the mobile terminal based on the distances between the coordinates of at least three wireless APs and the mobile terminal. In order to measure the distances between the mobile terminal and the wireless APs, signal strength may be converted into distance information or a time of arrival (ToA), a time difference of arrival (TDoA), an angle of arrival (AoA), etc. of the wireless signal may be used.

The landmark method refers to a method of measuring the position of the mobile terminal using a landmark transmitter, the position of which is known.

In addition to the above-described method, various algorithms may be used as the method of extracting (or analyzing) the position information of the mobile terminal.

The extracted position information of the mobile terminal 100 may be transmitted to the mobile terminal 100 through the Wi-Fi positioning server, such that the mobile terminal 100 may acquire the position information.

The mobile terminal 100 may access at least one wireless AP, thereby acquiring the position information. At this time, the number of wireless APs required to acquire the position information of the mobile terminal 100 may be variously changed according to the wireless communication environment in which the mobile terminal 100 is located.

Next, various embodiments of a method operating the deformable display device 200 will be described. The embodiments of the present invention are applicable to the stretchable display device 200_1 described with reference to FIGS. 2a to 2b and the rollable display device 200_2 described with reference to FIGS. 3a to 3c.

FIG. 5 is a flowchart illustrating a method of operating a deformable display device according to another embodiment of the present invention.

The controller 290 of the deformable display device 200 receives a command for setting a keyboard including a plurality of input buttons (S301) and displays a keyboard setting screen through the display unit 250 according to the received command (S303).

In one embodiment, the command for setting the keyboard may be input for touching a setting button provided in the display unit 250.

On the keyboard setting screen displayed according to the command for setting the keyboard, the type of the keyboard, the location of an input button group corresponding to the type of the keyboard, the sizes of input buttons, arrangement of the input buttons, etc. This will be described with reference to the following drawings.

Figure 6:
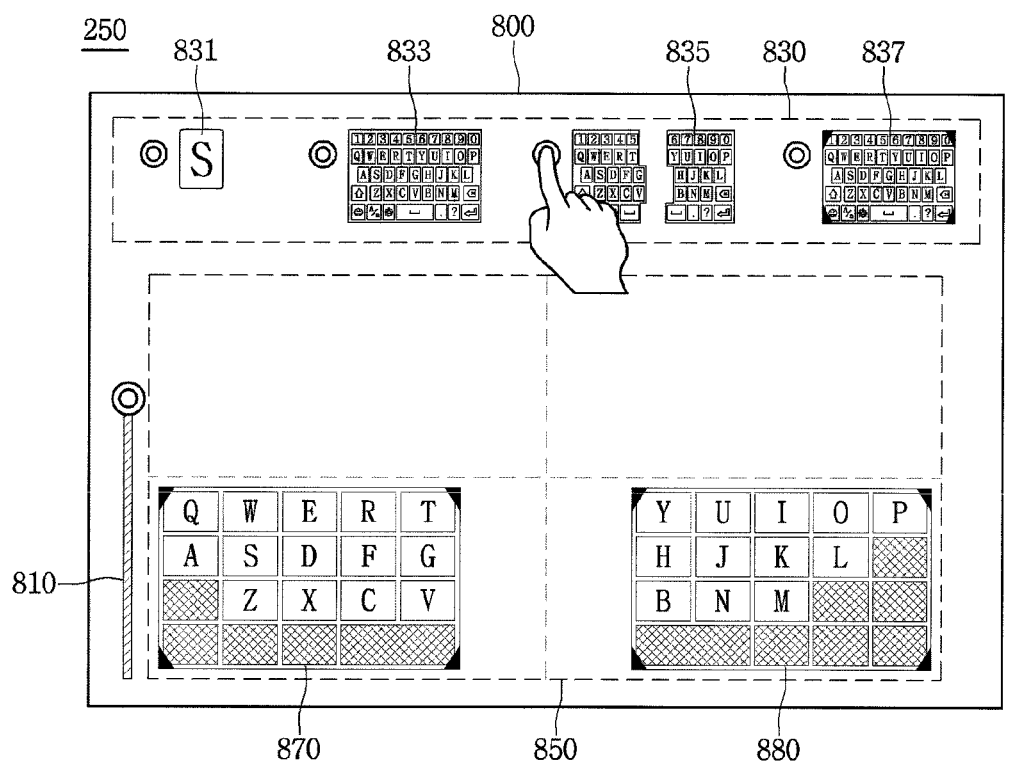
FIG. 6 is a diagram showing an example of a keyboard setting screen according to an embodiment of the present invention.

FIG. 6 is a diagram showing an example of a keyboard setting screen according to an embodiment of the present invention.

Referring to FIG. 6, a keyboard setting screen 800 may include a screen size setting bar 810, a keyboard type setting region 830 and a keyboard details setting region 850.

The screen size setting bar 810 may set the screen size of the display unit 250 corresponding to the type of the keyboard and the details of the keyboard. The screen size of the display unit 250 may be changed according to the extension distance of the display unit 250. The size of the details setting region 850 may also be changed according to the screen size of the display unit 250 set in the screen size setting bar 810. The user may set a total of four screen sizes through the screen size setting bar 810. For example, the four screen sizes may include a reference screen size as a screen size of the display unit 250 before extension, a first screen size of the display unit 250 less than the reference screen size, a second screen size of the display unit 250 greater than the reference screen size by a first extension distance, and a third screen size greater than the reference screen size by a second extension distance greater than the first extension distance. Although the number of screen sizes of the display unit 250 is 4 in the following embodiments, this is only exemplary.

The keyboard type setting region 830 may refer to a region for setting any one of a plurality of keyboard types. The plurality of keyboard types may include a handwriting keyboard type 831, a qwerty keyboard type 833, a split keyboard type 835 and a movable keyboard type 837.

The handwriting keyboard type 831 may be a keyboard type enabling the user to input characters, numerals, symbols, etc. The qwerty keyboard type 833 may be a keyboard type having arrangement of a general computer keyboard. The split keyboard type 835 may be a keyboard type for splitting a plurality of input button groups configuring the keyboard. The movable keyboard type 837 may be a keyboard type capable of moving the location of the keyboard. If any one of the plurality of keyboard types is selected, the controller 290 may control the display unit 250 to display a keyboard window corresponding to the selected keyboard type in the keyboard details setting region 850. For example, as shown in FIG. 38, if the split keyboard type 835 is selected in the keyboard type setting region 830, the controller 290 may control the display unit 250 to display a split keyboard window corresponding to the selected keyboard type in the keyboard details setting region 850. The split keyboard window may include a first input button group 870 and a second input button group 880.

The keyboard details setting region 850 may be a region for setting one or more of the shape, location and size of the keyboard corresponding to the screen size set through the screen size setting bar 810 and the keyboard type set in the keyboard setting region 830.

FIG. 5 will be described again.

The controller 290 receives keyboard setting input of setting the type of the keyboard corresponding to the extension distance of the display unit 250 and the details of the keyboard (S305), and stores a setting result according to the received keyboard setting input in the memory 270 (S307).

A process of setting the type of the keyboard and the details of the keyboard according to reception of the keyboard setting input will be described in the following drawings. Keyboard setting input may include at least one of keyboard type setting input of setting a keyboard type corresponding to the screen size of the display unit 250 and keyboard details setting input of setting one or more of the shape, location and size of the keyboard corresponding to the keyboard type.

In the below-described embodiments, assume that the display unit 250 is set to the third screen size greater than the reference screen size by the first extension distance through the screen size setting bar 810 and the keyboard type is set to the split keyboard type 835 in the keyboard type setting region 830.

Figure 7:
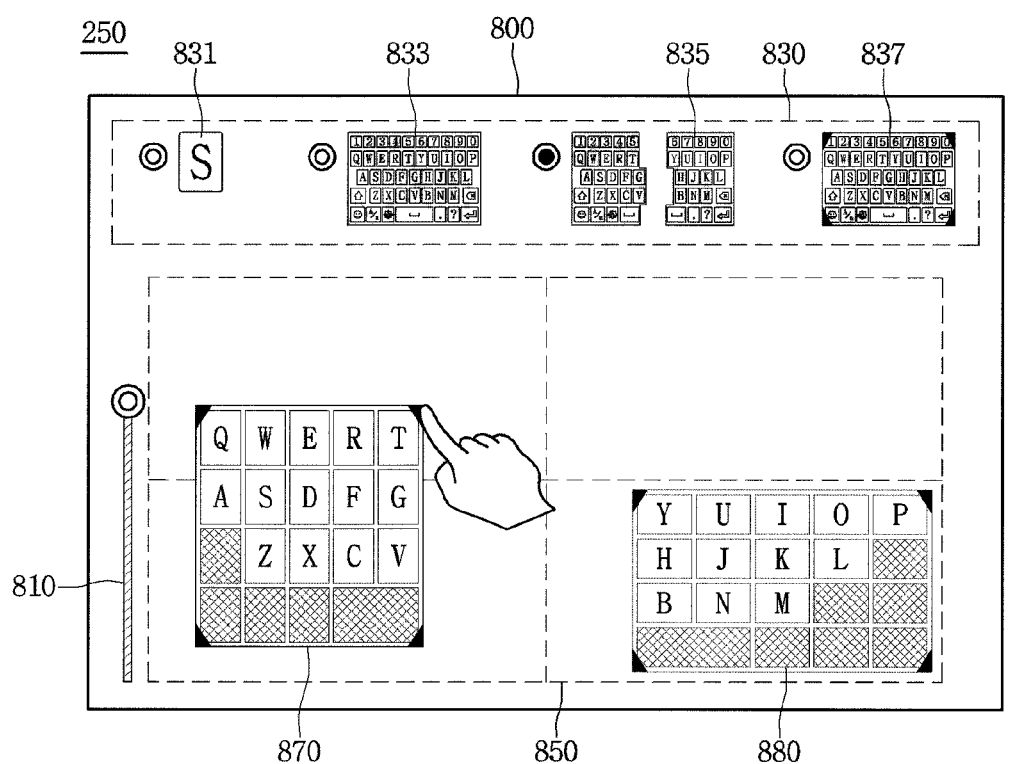
FIGS. 7 to 8 are diagrams illustrating an embodiment of setting the size and location of an input button group configuring a keyboard according to an embodiment of the present invention.
Figure 8:
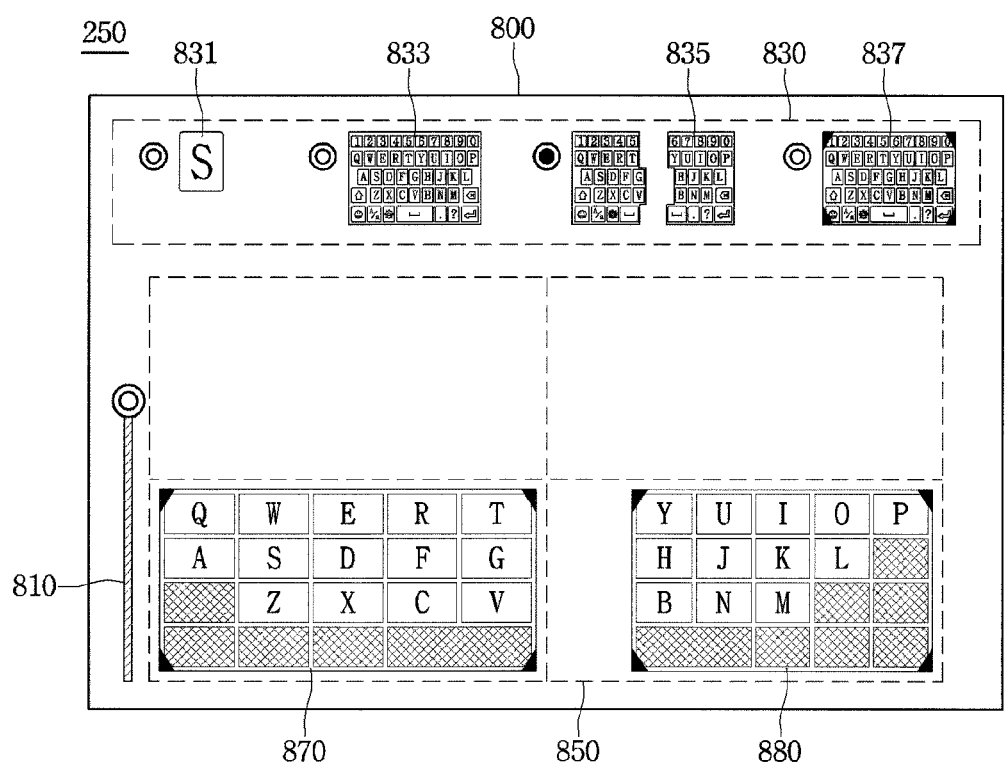

FIGS. 7 to 8 are diagrams illustrating an embodiment of setting the size and location of an input button group configuring a keyboard according to an embodiment of the present invention.

Referring to FIG. 7, a first input button group 870 and a second input button group 880 of the split keyboard window corresponding to the split keyboard type 835 may be displayed in the keyboard details setting region 850. Indicators for changing the size and shape of the first input button group window 870 may be displayed in corners of the first input button group window 870. The controller 290 may change the shape of the first window group window 870 according to input of selecting an indicator and input of moving the selected indicator in a specific direction. That is, the first input group window 870 of FIG. 7 has a height greater than that of the first input group window 870 of FIG. 6 and a width less than that of the first input group window 870 of FIG. 6

Next, FIG. 8 will be described.

Referring to FIG. 8, the controller 290 may select an indicator located at a right corner of the first input group window 870 and increase the size of the first input group window 870 according to input of moving the selected indicator in a horizontal direction.

Next, an embodiment of setting the location of an input button or an input button group configuring a keyboard window will be described.

FIGS. 9a to 9b and FIGS. 10a to 10b are diagrams illustrating an embodiment of setting the location of an input button or an input button group configuring a keyboard window according to an embodiment of the present invention.

Figure 9A:
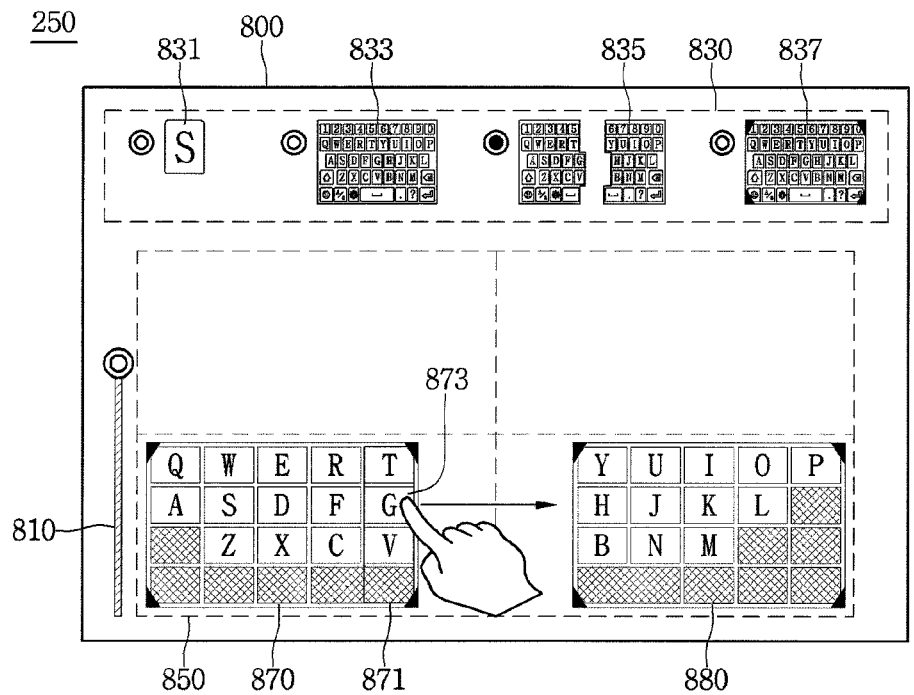
FIGS. 9a to 9b and FIGS. 10a to 10b are diagrams illustrating an embodiment of setting the location of an input button or an input button group configuring a keyboard window according to an embodiment of the present invention.
Figure 9B:
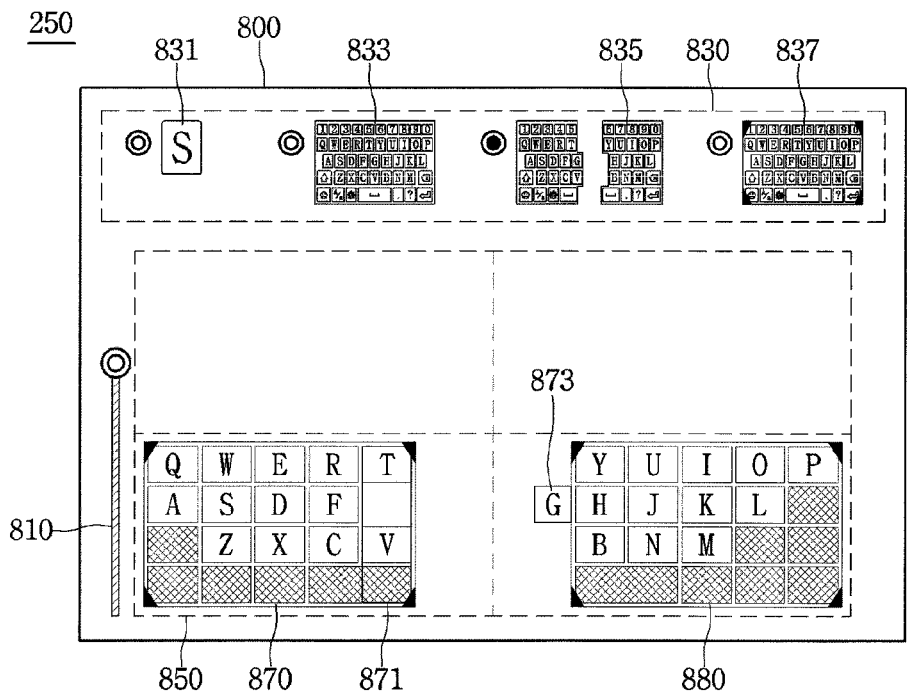

Referring to FIG. 9a, the controller 290 may select a G button 873 configuring an input button subgroup 871 included in the first input button group 870 and receive drag-and-drop input of the selected G button 873. The controller 290 may arrange the G button 873 adjacent to a second input button group 880 according to the received drag-and-drop input as shown in FIG. 9b. According to another embodiment of the present invention, the controller 290 may change the location of the G button 873 to a desired location according to input of touching the selected G button 873 for one second or more and flicking the G button 873.

Next, FIGS. 10a to 10b will be described.

Figure 10A:
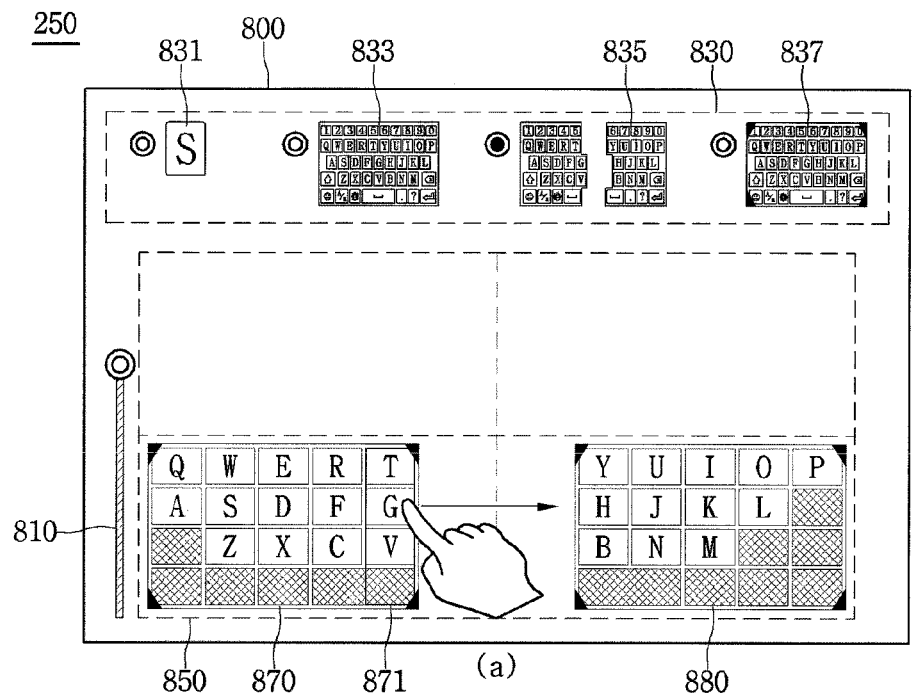
Figure 10B:
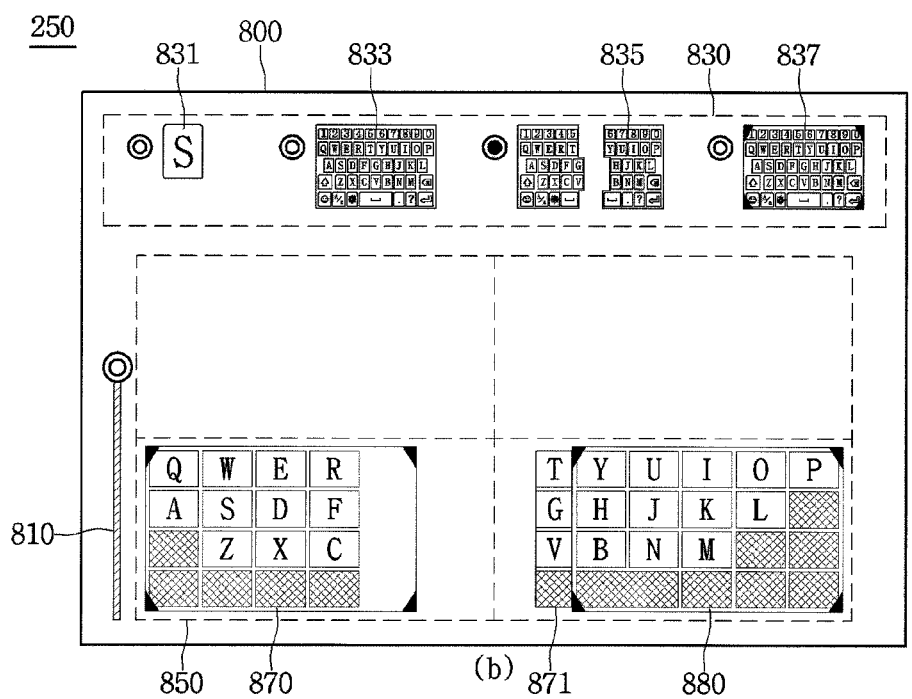

Referring to FIG. 10a, the controller 290 may select the input button subgroup 871 included in the first input button group 870 and receive the drag-and-drop input of the selected input button sub group 871. The controller 290 may arrange the input button sub group 871 adjacent to the second input button group 880 according to the received drag-and-drop input, as shown in FIG. 10b.

According to another embodiment of the present invention, the location and size of the input button subgroup included in the input button group will be adjusted. This will be described with reference to FIG. 11.

Figure 11:
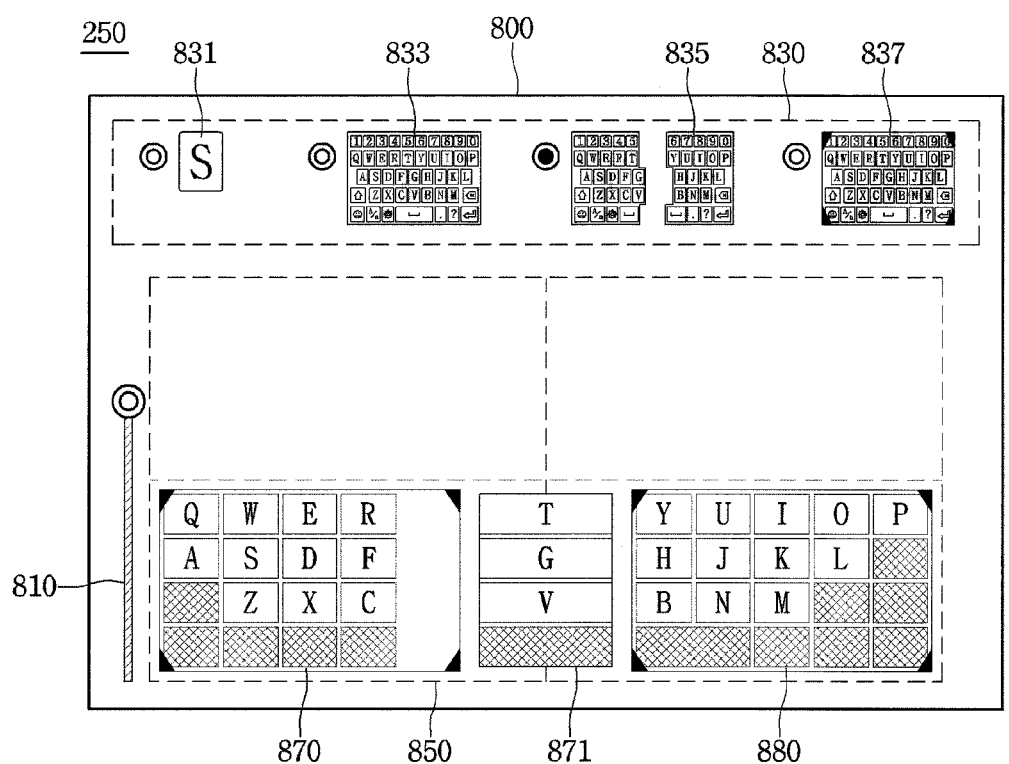
FIG. 11 is a diagram illustrating an embodiment of adjusting the size of an input button subgroup included in an input button group according to an embodiment of the present invention.

FIG. 11 is a diagram illustrating an embodiment of adjusting the size of an input button subgroup included in an input button group according to an embodiment of the present invention.

Referring to FIG. 11, the input button sub group 871 included in the first input button group 870 may be located between the first input button group 870 and the second input button group 880. The input button sub group 871 may be set to be arranged in an empty space between the first input button group 870 and the second input button group 880 configuring the split keyboard window. In addition, the size of the input button sub group 871 may be greater than those of the other input button subgroups in order to facilitate left/right input.

According to another embodiment of the present invention, input button subgroups may overlap. This will be described with reference to FIG. 12.

Figure 12:
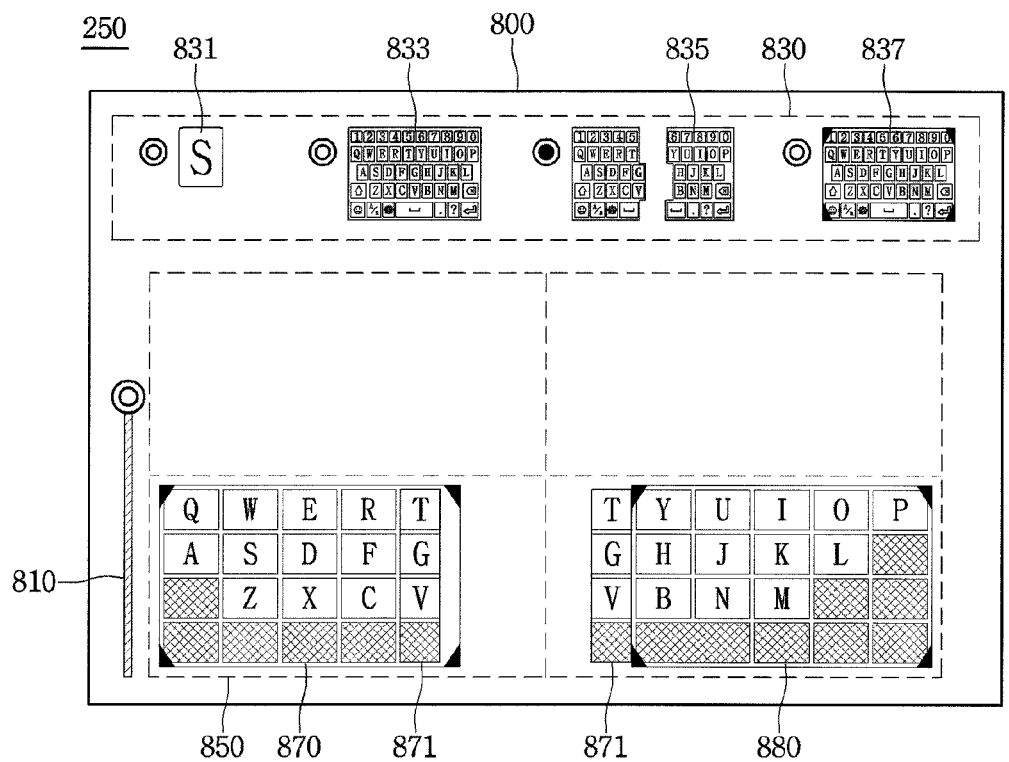
FIG. 12 is a diagram illustrating an embodiment of overlapping input button subgroups included in an input button group according to an embodiment of the present invention.

FIG. 12 is a diagram illustrating an embodiment of overlapping input button subgroups included in an input button group according to an embodiment of the present invention.

Referring to FIG. 12, the controller 290 may receive a command for overlapping the input button sub group 871 included in the first input button group 870 with the second input button group 880 and arrange the input button sub group 871 at the left side of the second input button group 880 according to the received command. Therefore, the user can easily touch input buttons included in the input button sub group 871 with both hands.

FIG. 5 will be described again.

The controller 290 senses force applied to the display unit 250 through the sensing unit 210 (S309) and extend the display unit 250 based on the direction of the sensed force (S311).

The controller 290 may sense the force applied to the display unit 250 through the sensing unit 210 and check the direction and strength of the sensed force. The controller 290 may extend the display unit 250 based on the checked direction and strength of the force.

As the display unit 250 is extended, the size of the screen of the display unit 250 may increase. In contrast, as the display unit 250 is reduced, the size of the screen of the display unit 250 may decrease. An embodiment of displaying different keyboard windows as the screen of the display unit 250 is extended or reduced is applicable to the stretchable display device 200_1 or the rollable display device 200_2.

The controller 290 displays a keyboard window corresponding to the extension distance of the display unit 250 and the details of the keyboard on the display unit 250 while extending the display unit 250 (S313).

The memory 270 may store the setting results of steps S305 and S307 in correspondence with the extension distance of the display unit 250, the keyboard type and the details of the keyboard. The extension distance of the display unit 250 may indicate the extension distance of the screen (or the screen size) of the display unit 250. The controller 290 may check the extension distance of the display unit 250 through the memory 270 and display the keyboard type corresponding to the checked extension distance and the details of the keyboard on the display unit 250. This will be described with reference to FIGS. 13a to 13d and FIGS. 14a to 14d.

FIGS. 13a to 13d and FIGS. 14a to 14d are diagrams illustrating an embodiment of providing various keyboard windows based on a degree of extension of a display unit according to an embodiment of the present invention.

FIGS. 13a to 13d and FIGS. 14a to 14d show an embodiment of a keyboard window provided as the deformable display device 200 is extended in the x-axis direction.

Figure 13A:
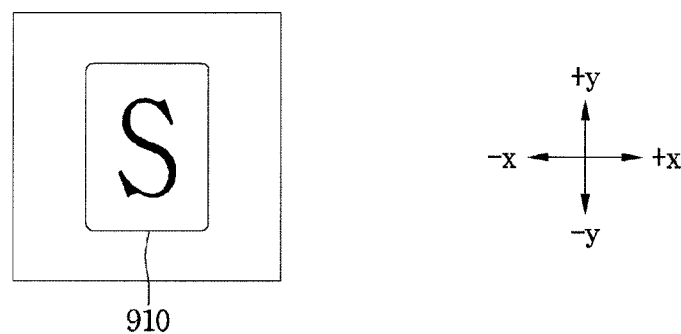
FIGS. 13a to 13d and FIGS. 14a to 14d are diagrams illustrating an embodiment of providing various keyboard windows based on a degree of extension of a display unit according to an embodiment of the present invention.
Figure 13B:
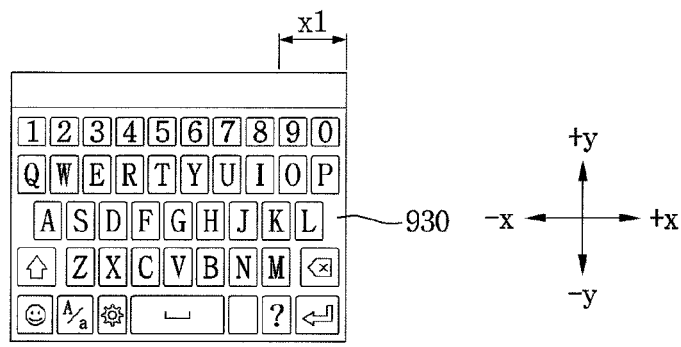

In addition, assume that the reference screen size before the display unit 250 is extended in FIGS. 13a to 13d is a size shown in FIG. 13b.

In addition, assume that the first screen size of the display unit 250 reduced by the predetermined distance as compared to the reference screen size corresponds to the handwriting keyboard type, the reference screen size corresponds to the qwerty keyboard type, the second screen size of the display unit 250 increased by the first extension distance as compared to before extension corresponds to the split keyboard type, the third screen size of the display unit 250 increased by the second extension distance greater than the first extension distance as compared to before extension corresponds to the movable keyboard type.

In addition, in FIGS. 13*a* to 13*d*, assume that the keyboard window is activated.

FIG. 13*a* shows a state in which the size of the display unit 250 is less than the reference screen size by the distance x1. The controller 290 may control the display unit 250 to display the handwriting keyboard window 910 corresponding to the handwriting keyboard type as the screen size of the display unit 250 decreases by a region corresponding to the distance x1. The controller 290 may reduce the display unit 250 if the size of the display device 250 before extension is reduced by the reference distance and display the predetermined handwriting keyboard window 910 on the screen of the reduced display unit 250.

FIG. 13*b* shows the case where the size of the display unit 250 is the reference screen size. The controller 290 may control the display unit 250 to display the qwerty keyboard window 930 of the qwerty keyboard type corresponding to the reference screen size.

Figure 13C:
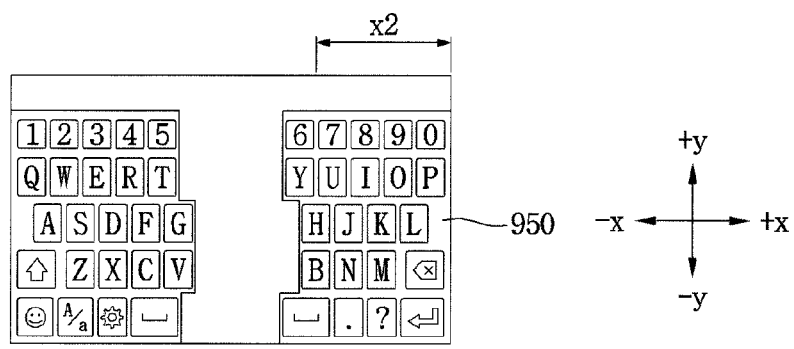

FIG. 13*c* shows a state in which the size of the display unit 250 increases by the first extension distance x1 as compared to the reference screen size. The controller 290 may control the display unit 250 to display the split keyboard window while increasing the display unit 250 by the first extension distance x2. The first extension distance x2 may be greater than the first extension distance. The first reference extension distance may be an extension distance used as a criterion for displaying the split keyboard window 950. The controller 290 may extend the display unit 250 when the display unit 250 before extension is extended by the first reference extension distance or more and the second reference extension distance or less and display the predetermined split keyboard window 950 on the extended display unit 250.

Figure 13D:
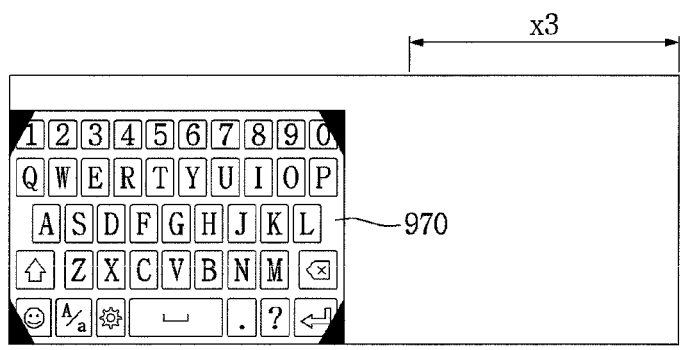

FIG. 13*d* shows a state in which the size of the display unit 250 increases by a second extension distance x3 as compared to the reference screen size. The controller 290 may control the display unit 250 to display the movable keyboard window 970, while increasing the display unit 250 by the second extension distance x3. The second extension distance x3 may be greater than a second reference extension distance. The second extension distance may be as an extension distance used as a criterion for displaying the movable keyboard window 970. As the display unit 250 is extended, the arrangement of the movable keyboard window 970 may be changed to be located in the extended area. The controller 290 may extend the display unit 250 and display the predetermined movable keyboard window 970 on the screen of the display unit 250, if the display unit 250 is extended by the second reference extension distance or more.

According to the embodiment of the present invention, as the display unit 25 is extended or reduced, the keyboard window displayed on the screen of the display unit 250 may be changed to suit various requests of the user.

Next, FIGS. 14*a* to 14*d* will be described.

Figure 14A:
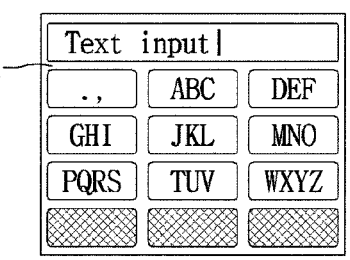

Assume that the reference screen size before extension of the display unit 250 is a size shown in FIG. 14*a*.

Figure 14B:
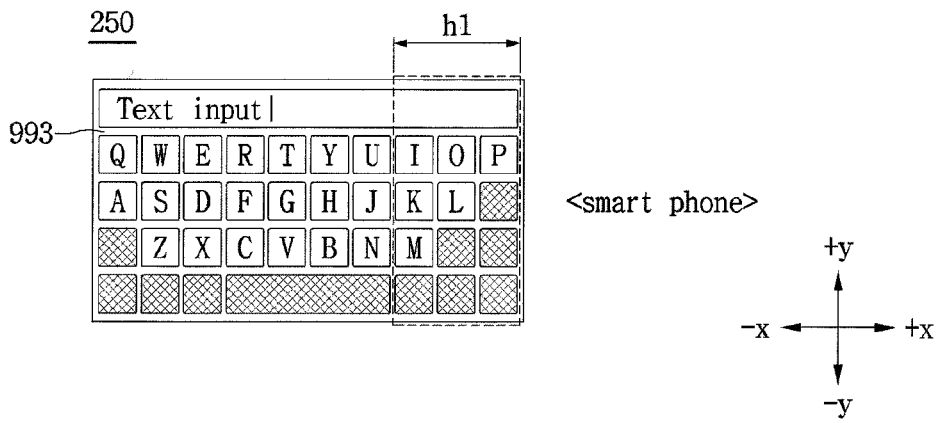

In addition, in FIGS. 14*a* to 14*b*, assume that the deformable display device 200 may be used as a wearable device, a smartphone, a phablet or a tablet according to a degree of extension.

FIG. 14*a* shows the state before the display unit 250 is extended and the deformable display device 200 is a wearable device capable of being put on a part of the body of the user. The display unit 250 displays a reduced keyboard window 991 for displaying a plurality of characters on one input button.

If force is applied to the display unit 250, the controller 290 may extend the display unit 250 by a first extension distance h1, as shown in FIG. 14*b*. The controller 290 may control the display unit 250 to display a qwerty keyboard window 993 as the display unit 250 is extended by the first extension distance h1. In the qwerty keyboard window 993, one character may be displayed in one input button. The deformable display device 200 including the display unit 250 shown in FIG. 14 may be used as a smartphone.

Figure 14C:
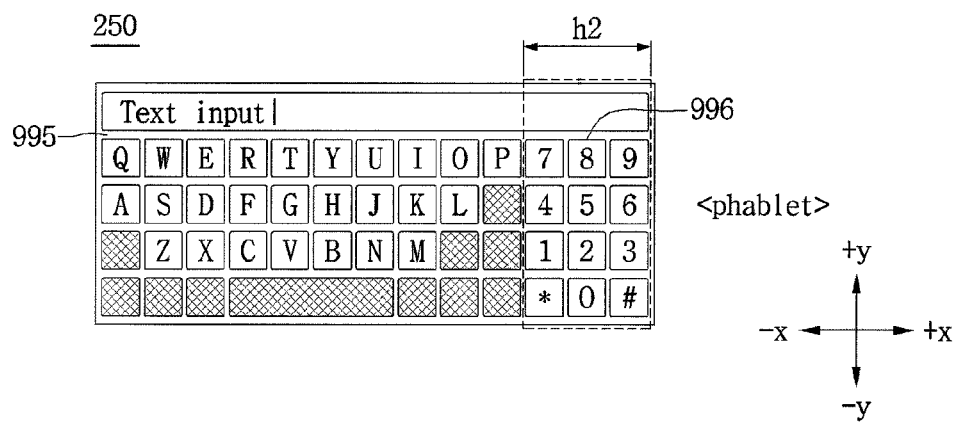

If additional force is applied to the display unit 250 extended by the first extension distance h1, the controller 290 may further extend the display unit 250 by the second extension distance h2 as shown in FIG. 14*c*. The controller 290 may control the display unit 250 to display a plurality of numerical buttons in a region extended by extending the display unit 250 by the second extension distance h2. The deformable display device 200 including the display unit 250 shown in FIG. 14*c* may be used as a phablet including the functions of a smartphone and a tablet.

Figure 14D:
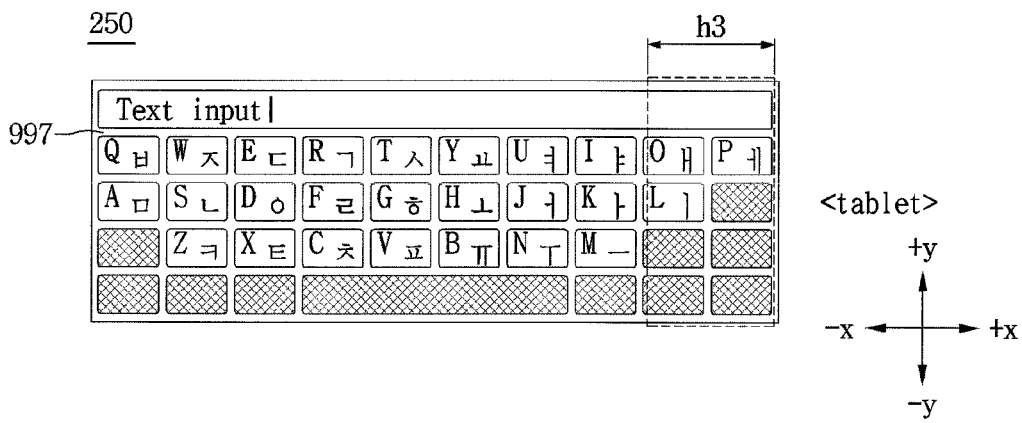

If additional force is applied to the display unit 250 extended by the first extension distance h1 and the second extension distance h2, the controller 290 may further extend the display unit 250 by a third extension distance as shown in FIG. 14*d*. The controller 290 may control the display unit 250 to display an enlarged qwerty keyboard window 997 for displaying consonants or vowels of English and Korean alphabet on one input button as the display unit 250 is extended by the third extension distance h3. In addition, the controller 290 may increase the size of the input buttons and a gap between the input buttons included in the qwerty keyboard window 997 while extending the display unit 250. Meanwhile, if the display unit 250 is extended by a maximum size, the controller 290 may arrange the keyboard window in the center of the screen of the display unit 250.

The deformable display device 200 including the display unit 250 shown in FIG. 14*d* may be used as a tablet.

Next, an example of a keyboard window provided as the deformable display device 200 is extended in a −y-axis direction will be described with reference to FIGS. 15*a* to 15*c*.

Figure 15A:
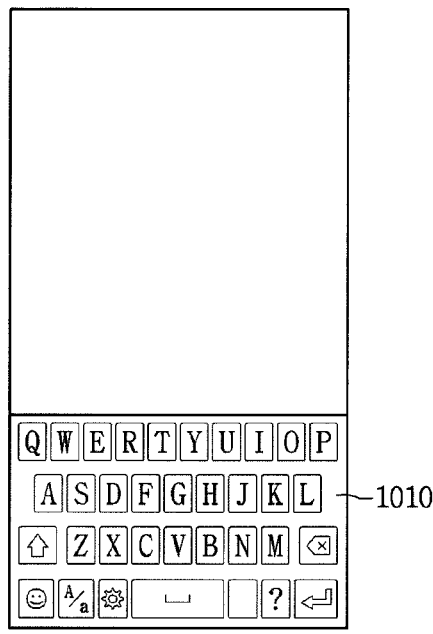
FIGS. 15a to 15c are diagrams illustrating an example of a keyboard window provided as a deformable display device is extended in a −y-axis direction according to an embodiment of the present invention.
Figure 15B:
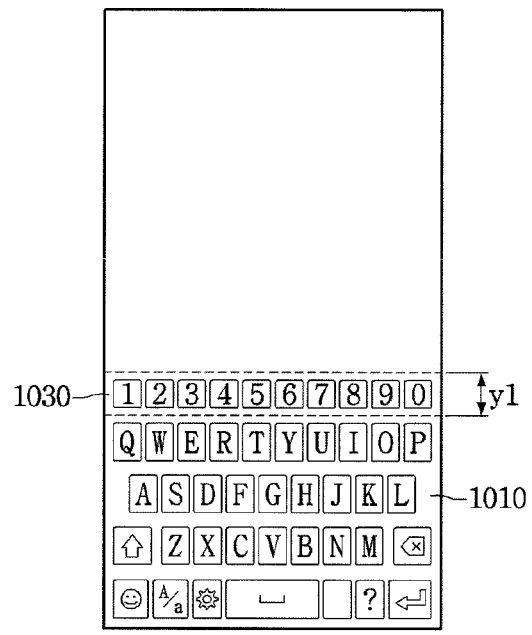
Figure 15C:
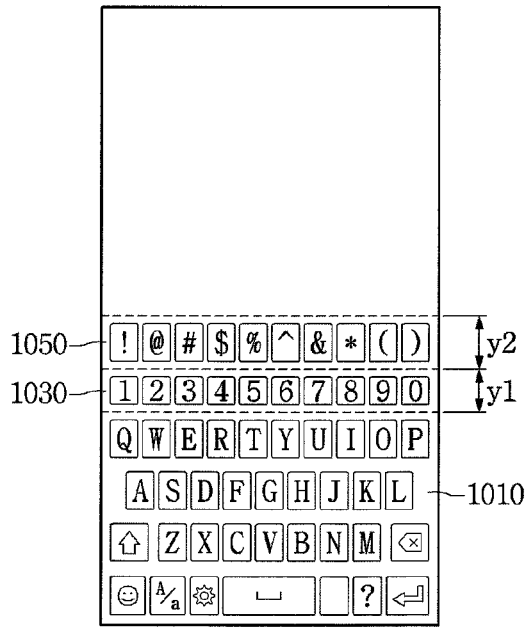

FIGS. 15*a* to 15*c* are diagrams illustrating an example of a keyboard window provided as a deformable display device is extended in a −y-axis direction according to an embodiment of the present invention.

The screen size of the display unit 250 shown in FIG. 15*a* may be a reference screen size. On the screen of the display unit 250, a qwerty keyboard window 1010 which does not include numerical buttons is shown.

In this state, if force is applied to the display unit 250, the controller 290 may extend the display unit 250 by a first extension distance y1 in the −y-axis direction, as shown in FIG. 15*b*. The controller 290 may control the display unit 250 to display a plurality of numerical buttons in a first extension region 1030 extended as the display unit 250 is extended by the first extension distance y1.

If additional force is applied to the display unit 250 in a state in which the display unit 250 is extended by the first extension distance y1, the controller 290 may additionally extend the display unit 250 by a second extension distance y2 in the −y-axis direction. Therefore, the display unit 250 may be extended by a second extension region 1050 corresponding to the second extension distance y2. The controller 290 may control the display unit 250 to display a plurality of symbol buttons in the second extension region 1050. The input buttons displayed in the first extension region 1030 and the second extension region 1050 may be predetermined by the user in steps S301 to S307 of FIG. 5.

The user may view the numerical buttons or the symbol buttons only by extending the display unit 250 without pressing a separate input button.

FIG. 5 will be described again.

The controller 290 checks whether a returning trigger for returning the screen size of the display unit 250 to the reference screen size is acquired (S315) and reduce the extended display unit 250 into the original reference screen size when the returning trigger is acquired (S317).

The controller 290 displays the keyboard window corresponding to the reference screen size and the details of the keyboard window on the display unit 250 as the screen of the display unit 250 is reduced to the reference screen size (S319).

In one embodiment, the returning trigger may correspond to a state in which the extended deformable display device 200 is placed on a flat surface. That is, the controller 290 may sense that the deformable display device 200 is placed on a surface through the gyro sensor provided in the deformable display device 200 and reduce the extended display unit 250 to an unextended state according to the sensed result.

In another embodiment, the returning trigger may be a state in which force for reducing the extended display unit 250 is applied. The controller 290 may reduce the display unit 250 to an unextended state according to force for reducing the extended display unit 250.

Steps S315 to S317 will be described with reference to FIGS. 16*a* to 16*b*.

Figure 16A:
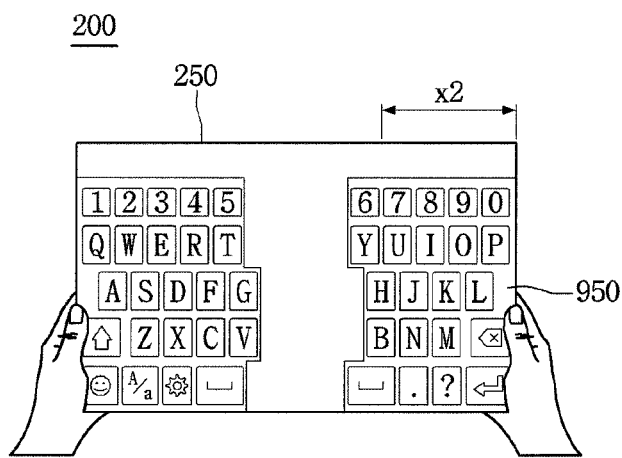
FIGS. 16a to 16b are diagrams illustrating operation of a display unit when a deformable display device is placed on a surface, according to an embodiment of the present invention.
Figure 16B:
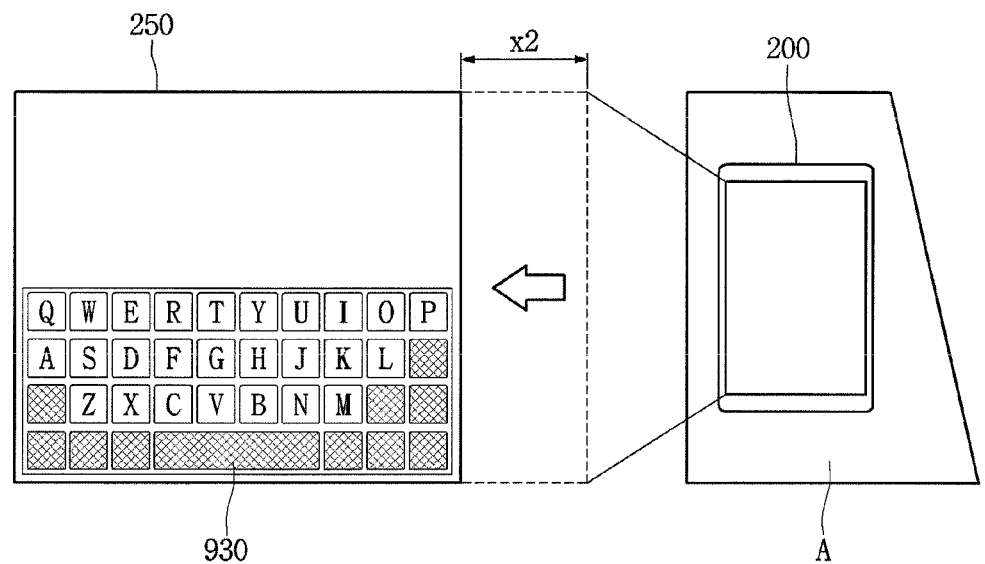

FIGS. 16*a* to 16*b* are diagrams illustrating operation of a display unit when a deformable display device is placed on a surface according to an embodiment of the present invention.

Referring to FIG. 16*a*, the display unit 250 is extended by a specific extension distance x2 in a +x-axis direction. The display unit 250 may display a split keyboard window 950 corresponding to an extension distance x2. That is, the user may use the split keyboard window 950 displayed on the display unit 250 by extending the deformable display device 200. In this state, if the deformable display device 200 is placed on the surface A, the controller 290 may sense that the deformable display device is placed and return the display unit 250 to an unextended state. That is, the controller 290 may reduce display unit 250 to the unextended state. Therefore, the screen size of the display unit 250 may be reduced to the reference screen size. The controller 290 may control the display unit 250 to display the qwerty keyboard window 930 corresponding to the reference screen size.

When the user puts down the deformable display device 200 on the floor, the user may view keyboard window corresponding to the reference screen size as the display unit 250 is reduced to the reference screen size.

According to another embodiment of the present invention, even when the deformable display device 200 is put down on the surface (A), the extended display unit 250 may display the split keyboard window 950 without change.

The present invention as described above may be implemented as code that can be written on a computer readable medium in which a program is recorded and thus read by a computer. The computer readable medium includes all kinds of recording devices in which data is stored in a computer readable manner. Examples of the computer readable recording medium may include a hard disk drive (HDD), a solid state disk (SSD), a silicon disk drive (SDD), a ROM, a RAM, a CD-ROM, a magnetic tape, a floppy disc, and an optical data storage device. In addition, the computer readable medium is implemented in a carrier wave (e.g., data transmission over the Internet). In addition, the computer may include the controller 180 of the terminal. Thus, the above detailed description should not be construed as limited to the embodiments set forth herein in all terms and be considered by way of example. The scope of the present invention should be determined by the reasonable interpretation of the accompanying claims and all changes in the equivalent range of the present invention are intended to be included in the scope of the present invention.

The invention claimed is:

1. A method of operating a deformable display device including a deformable display unit, the method comprising:
   displaying a first type keyboard window on the display unit;
   sensing an extension or a reduction of the display unit;
   extending or reducing a screen displayed by the display unit by a sensed result;
   changing the first type keyboard window to a second type keyboard window according to sensing the extension or the reduction of the screen;
   receiving keyboard setting input for setting the keyboard type corresponding to the extension distance of the display unit;
   storing a setting result according to the received keyboard setting input;
   receiving a command for keyboard setting; and
   displaying a keyboard setting screen according to the received command,
   wherein the keyboard setting screen includes:
   a screen size setting bar for setting a screen size of the display unit; and
   a keyboard type setting region for setting a keyboard type corresponding to the screen size.

2. The method according to claim 1, wherein the keyboard setting screen further includes a keyboard details setting region for setting one or more of a shape, location and size of a keyboard corresponding to a screen size of the display unit set through the screen size setting bar and the keyboard type set in the keyboard type setting region.

3. The method according to claim 2, further comprising receiving keyboard details setting input for setting at least one of the shape, location and size of one or more input buttons configuring the keyboard in the keyboard details setting region,
   wherein the displaying of the keyboard window includes displaying details set according to the keyboard details setting input and a keyboard window of the keyboard type set according to the keyboard type setting input.

4. The method according to claim 1, further comprising:
   acquiring a returning trigger for returning the extended display unit to a reference screen size as an original size;
   reducing the extended display unit to the reference screen size according to the acquired returning trigger; and
   displaying the keyboard window of the keyboard type corresponding to the reference screen size.

5. The method according to claim 1, wherein the keyboard type is any one of a handwriting keyboard type, a qwerty keyboard type, a split keyboard type for splitting a plurality of input button groups configuring a keyboard window and a movable keyboard type capable of moving a location of the keyboard window.

6. A deformable display device comprising:
a memory;
a display unit extended or reduced in at least one direction;
a sensing unit configured to sense an extension or a reduction of the display unit; and
a controller configured to control the display unit to:
display a first type keyboard window on the display unit, extend or reduce a screen displayed by the display unit based on the sensed force,
change the first type keyboard window to a second type keyboard window according to sensing the extension or the reduction of the screen,
receive keyboard setting input for setting the keyboard type corresponding to the extension distance of the display unit,
store, in the memory, a setting result according to the received keyboard setting input, and
receive a command for keyboard setting and control the display unit to display a keyboard setting screen according to the received command,
wherein the keyboard setting screen includes:
a screen size setting bar for setting a screen size of the display unit; and
a keyboard type setting region for setting a keyboard type corresponding to the screen size.

7. The deformable display device according to claim 6, wherein the keyboard setting screen further includes a keyboard details setting region for setting one or more of a shape, location and size of a keyboard corresponding to a screen size of the display unit set through the screen size setting bar and the keyboard type set in the keyboard type setting region.

8. The deformable display device according to claim 7, wherein the controller receives keyboard details setting input for setting at least one of the shape, location and size of one or more input buttons configuring the keyboard in the keyboard details setting region, and controls the display unit to display details set according to the keyboard details setting input and a keyboard window of the keyboard type set according to the keyboard type setting input.

9. The deformable display device according to claim 6, wherein the keyboard type is any one of a handwriting keyboard type, a qwerty keyboard type, a split keyboard type for splitting a plurality of input button groups configuring a keyboard window and a movable keyboard type capable of moving a location of the keyboard window.

* * * * *